(12) United States Patent
Mitsutani et al.

(10) Patent No.: US 7,515,764 B2
(45) Date of Patent: Apr. 7, 2009

(54) IMAGE PROCESSING APPARATUS USING MORPHOLOGY

(75) Inventors: Naoki Mitsutani, Kawasaki (JP); Masaki Kurihara, Kawasaki (JP)

(73) Assignee: Mitutoyo Corporation, Kawasaki-shi (JP)

(*) Notice: Subject to any disclaimer, the term of this patent is extended or adjusted under 35 U.S.C. 154(b) by 733 days.

(21) Appl. No.: 11/114,302

(22) Filed: Apr. 25, 2005

(65) Prior Publication Data

US 2005/0238248 A1    Oct. 27, 2005

(30) Foreign Application Priority Data

Apr. 26, 2004    (JP)    ............... 2004-129902

(51) Int. Cl.
    *G06K 9/42*    (2006.01)
    *G06K 9/56*    (2006.01)
(52) U.S. Cl. ...................... 382/257; 382/308
(58) Field of Classification Search ......... 382/256–259, 382/308; 358/3.07, 3.28, 3.13
    See application file for complete search history.

(56) References Cited

U.S. PATENT DOCUMENTS

| | | | |
|---|---|---|---|
| 4,866,785 A | 9/1989 | Shibano | |
| 5,214,712 A | 5/1993 | Yamamoto et al. | |
| 5,311,598 A | 5/1994 | Bose et al. | |
| 5,546,479 A | 8/1996 | Kawanaka | |
| 5,724,454 A | 3/1998 | Shimazu | |
| 6,445,831 B1 | 9/2002 | Arai | |
| 6,584,420 B1 | 6/2003 | Minami | |
| 6,839,457 B1 | 1/2005 | Azuma | |
| 7,027,660 B2* | 4/2006 | Hersch et al. | ............... 382/257 |

FOREIGN PATENT DOCUMENTS

| | | |
|---|---|---|
| EP | 0 536 705 A2 | 4/1993 |
| JP | 62-154179 A | 7/1987 |
| JP | 2-21380 A | 1/1990 |
| JP | 3-83179 A | 4/1991 |
| JP | 5-182022 A | 7/1993 |
| JP | 5-223749 A | 8/1993 |
| JP | 6-261209 A | 9/1994 |
| JP | 6-305110 A | 11/1994 |
| JP | 10-177655 A | 6/1998 |
| JP | 11232452 | 8/1999 |

(Continued)

OTHER PUBLICATIONS

Office Action dated Sep. 25, 2006, issued in corresponding European Application No. 05 009 007.5—2218.

(Continued)

*Primary Examiner*—Yon Couso
(74) *Attorney, Agent, or Firm*—Christensen O'Connor Johnson Kindness PLLC

(57) ABSTRACT

An image processing apparatus which uses morphology is provided. A masked image is provided to a morphological processing section of the image processing apparatus. The morphological processing section calculates the opening gap of the masked image, calculates the minimum number N of iterations of dilations required for filling the opening gap and, after performing N dilations, executes N erosions to remove a mesh pattern. Then, an edge detecting section detects the edges of a wiring pattern in the image and a measuring section calculates the distance between the edges, which is the width of the wiring.

8 Claims, 9 Drawing Sheets

FOREIGN PATENT DOCUMENTS

| | | |
|---|---|---|
| JP | 11259651 | 9/1999 |
| JP | 11298738 | 10/1999 |
| JP | 2001-216317 A | 8/2001 |
| JP | 2001-221750 A | 8/2001 |
| JP | 2002094799 | 3/2002 |
| JP | 2003-8899 A | 1/2003 |
| JP | 2003-168114 A | 6/2003 |
| JP | 2003203218 A | 7/2003 |
| JP | 2003-233818 A | 8/2003 |
| WO | 00/74567 A1 | 12/2000 |

OTHER PUBLICATIONS

Flouzat, G., "Review on Image Analysis With Mathematical Morphology in Remote Sensing," *Proceedings of the International Geoscience and Remote Sensing Symposium* 4(12):2424-2429, Vancouver, Canada, Jul. 10-14, 1989.

First Office Action from corresponding Chinese Application No. 200510066917.2, mailed Jun. 13, 2008, with excerpt translated into English, 4 pages.

Notice of Grounds for Rejection (JP) dated Aug. 12, 2008, issued in corresponding Japanese Application No. 2004-129902.

Notice of Grounds for Rejection (JP) dated Nov. 11, 2008, issued in corresponding Japanese Application No. 2004-129902, 9 pages.

Ohkubo, T., et al., "Primitive Shape Estimation on Primitive and Point Configuration Texture Model," Technical Report of the Institute of Electronics, Information and Communication Engineers 102(708):55-59, Mar. 14, 2003.

Yashima, S., and A. Taguchi, "Modeling of Texture Images Composed of Two Particulate Feature by Using the Structuring Elements of Morphology Filters," Proceedings of the 17th Picture Coding Symposium of Japan [PCSJ 2002], Shizuoka, Japan, Nov. 13, 2002, pp. 19-20.

\* cited by examiner

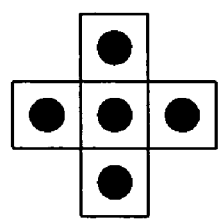
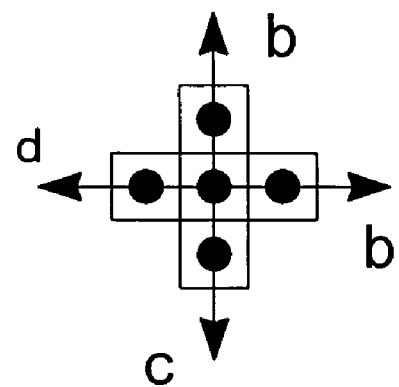
Fig. 10A    Fig. 10B
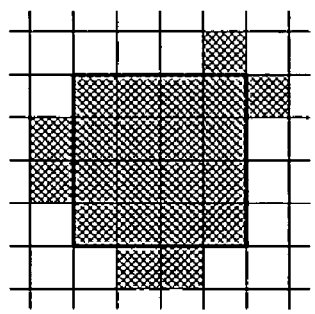
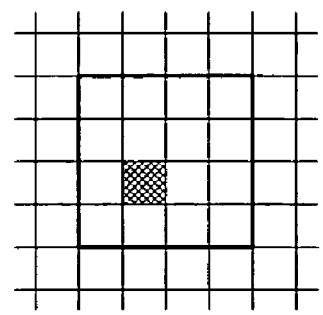
Fig. 12A    Fig. 12B

IMAGE PROCESSING APPARATUS USING MORPHOLOGY

BACKGROUND OF THE INVENTION

1. Field of the Invention

The present invention generally relates to an image processing apparatus and, more particularly, to a technique for morphologically processing an image masked with a given mesh pattern.

2. Related Art

Morphology is one known process for removing noise from various types of images. In morphological processing, images are processed using dilation, erosion, opening, and closing independently or in combination.

Dilation is a process in which the maximum value (Minkowski sum) within the range of ±m from a pixel of interest is searched for, where m depends on the structuring element. Erosion is a process in which the minimum value (Mincowski difference) within the range of ±m from a pixel of interest is searched for. Opening consists of a erosion followed by dilation; that is, the minimum value is first searched for and then the maximum value is searched for. Closing consists of a dilation followed by erosion; that is, the maximum value is first searched for and then the minimum value is searched for. These operations are used for removing isolated points, connecting discontinuous points, or filling up gaps.

FIGS. 10 to 12 schematically show dilation and erosion operations. FIG. 10A shows a structuring element (kernel); FIG. 10B shows the directions of displacement of the structuring element. The four structuring elements existing in four positions, top, bottom, left, and right, means that the original image is to be displaced in the four directions a, b, c, and d by one pixel.

FIG. 11 shows an image resulting from displacing the original image in the directions shown in FIG. 10B. In FIG. 11, image "a" is an image resulting from the displacement of the original image in direction a shown in FIG. 10B by one pixel, image "b" is an image resulting from the displacement of the original image in direction b shown in FIG. 10B by one pixel, image "c" is an image resulting from the displacement of the original image in direction c shown in FIG. 10B by one pixel, and image "d" is an image resulting from the displacement of the original image in direction d shown in FIG. 10B by one pixel.

FIG. 12A shows the Minkowski sum (all regions where the image exists) of the original image and the four images a to d shown in FIG. 11, that is, the result of dilation. FIG. 12B shows the Minkowski difference (only the common region) of the original image and the four images a to d shown in FIG. 11, that is, the result of erosion. Techniques in which morphological operations are used to reduce noise in images are described in Japanese Patent Laid-Open Publication No. Hei 11-259651 and No. 2002-94799.

When a printed circuit board image passed through a screen mask as shown in FIG. 13 is inspected and the width A and diameter B of wiring is to be measured, typically only the distances between the edges are measured. However, although such measurement require the detection of the edges, detection can be problematic when the image is masked with a mesh pattern as shown.

FIG. 14 shows an enlarged view of a portion of the wiring pattern shown in FIG. 13. Because the wiring pattern is separated into regions by the presence of the mesh pattern, boundaries 200 inside the wiring pattern, which are not actual edges, are also detected in addition to the edges 100 of the actual wiring pattern. Therefore, the width A or diameter B of the wiring cannot accurately measured from these edges. Regions, such as regions a and b, in FIG. 14 formed as a result of the presence of the mesh pattern are referred to as openings herein and the gap between such regions is referred to as an opening gap (the width of the mesh pattern).

Morphological operations maybe used to remove the mesh pattern from the original image to obtain the image of the wiring pattern alone prior to performing the edge detection of the wiring pattern. That is, dilation may be performed on the original image, a visual check may be made to see that the mesh pattern is filled up, and then erosion may be performed to restore the dilated portion, thus removing the mesh pattern.

However, it is desirable that the number of morphological operations be minimized in order to minimize deformation of the image, because dilation and erosion are irreversible processes that cannot restore the original image. It is desirable that the number of the dilation operations and the number of the erosion operations should be minimized

SUMMARY OF THE INVENTION

The present invention advantageously provides an image processing apparatus that can remove a mesh pattern region from an original image masked with the mesh pattern and can minimize deformation of the original image.

The present invention provides an image processing apparatus which processes an input image by performing dilation operations and erosion operations of morphological processing in sequence on the input image, including means for inputting a masked image masked with a given mesh pattern; opening gap calculating means for calculating an opening gap in the mesh pattern in the masked image; means for calculating the required minimum number of iterations of the dilation operations and the erosion operations according to the opening gap and the structuring element; and means for removing the mesh pattern from the masked image by performing the required minimum number of the dilation operations on the masked image and then performing the required minimum number of the erosion operations.

According to one aspect of the present invention, the opening gap calculating means includes means for extracting closed regions in the masked image other than the mesh pattern; and means for calculating the opening gap as the distance between the boundaries of neighboring closed regions among the closed regions.

According to another aspect of the present invention, the opening gap calculating means includes means for Radon-transforming the masked image and means for calculating the opening gap from a gray pattern obtained by the Radon transformation.

According to another aspect of the present invention, the opening gap calculating means includes means for Fourier-transforming the masked image and means for calculating the opening gap from an amplitude spectrum obtained by the Fourier transformation.

The present invention also provides an image processing method for processing an input image by performing dilation operations and erosion operations of morphological processing in sequence on the input image, including the steps of inputting a masked image masked with a given mesh pattern; calculating an opening gap in the mesh pattern in the masked image; setting a structuring element for the morphological processing; calculating the required minimum number of iterations of the dilation operations and the erosion operations according to the opening gap and the structuring element; and removing the mesh pattern from the masked image by performing the required minimum number of iterations of the dilation operations on the masked image and then performing the required minimum number of iterations of the erosion operations.

According to the present invention, the opening gap of a mesh pattern contained in a masked image and the minimum number of iterations of processing required for filling up the opening gap are calculated. That is, if an opening gap exists, the opening gap can be filled by repeating dilation operation. The structuring element (kernel) in morphology processing provides the number of displacement pixels of the original image and the opening gap provides the total number of displacement pixels required for filing up the opening gap. Therefore, the minimum number of iterations required for filling the opening gap can be obtained from the structuring element and the opening gap. By repeating the required minimum number of dilations on the masked image, the opening gap is filled. Then, by repeating the required minimum number of erosions to reduce it in the original size, an image can be obtained from which the opening gap has been removed with minimum deformation of the original image. According to the present invention, a mesh pattern can be removed from a masked image and therefore the original image pattern contained in the masked image can be extracted and various kinds of image processing such as edge detection and edge enhancement can be applied to the original image pattern.

BRIEF DESCRIPTION OF THE DRAWINGS

A preferred embodiment of the present invention will be described in detail based on the following figures, wherein:

FIGS. 10A and 10B are diagrams illustrating a structuring element (kernel);

FIGS. 12A and 12B are diagrams illustrating dilation and erosion, respectively, of the set of images shown in FIG. 11;

DESCRIPTION OF THE PREFERRED EMBODIMENT

A preferred embodiment of the present invention will be described below with reference to the accompanying drawings.

Figure 1:
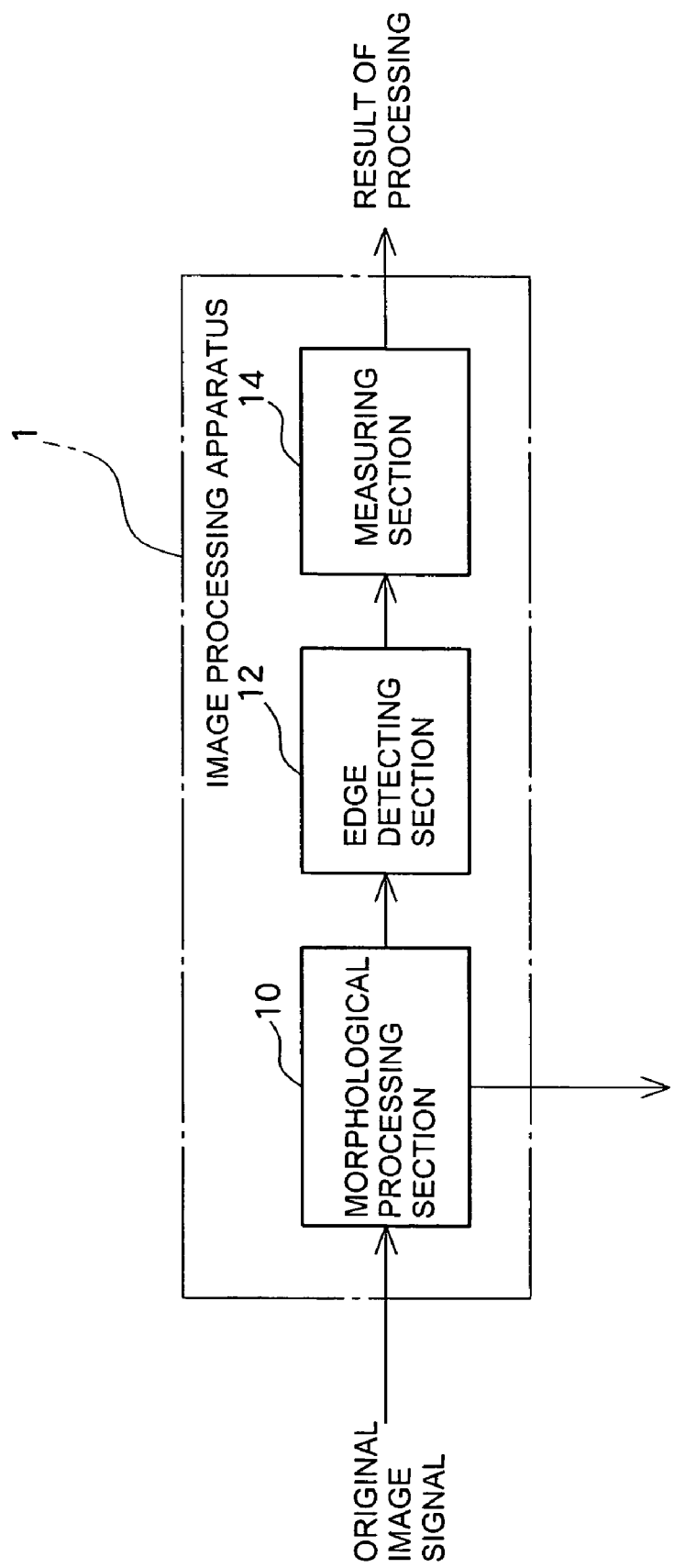
FIG. 1 is a block diagram of a configuration according to an embodiment of the present invention.

FIG. 1 shows a block diagram illustrating a configuration of an image processing according to the present embodiment.

The image processing apparatus 1 includes a morphological processing section 10, an edge detecting section 12, and a measuring section 14.

The morphological processing section 10 performs dilation and erosion operations on an input original image (masked original image with a mesh pattern) to remove the mesh pattern. The image resulting from removing the mesh pattern from the original image, for example a wiring pattern image of a printed circuit board, is provided to the edge detecting section 12. The number N of iterations of dilations and the number N of iterations of erosions will be set to the minimum value required. The morphology processing section 10 first calculates the minimum number N of iterations required for removing the mesh pattern from the input original image. Then it performs N dilations on the original image to fill the mesh pattern and then performs N erosions to restore the dilated portion to remove the mesh pattern. The minimum number N of iterations is determined from the distance between closed regions (which correspond to regions a, b, c, and d in FIG. 14) of the original image formed by the presence of the mesh pattern, that is, opening gap D (see FIG. 14), and the structuring element for the morphological processing. The structuring element provides the number of displacement pixels of the original image, and the opening gap D provides the total number of displacements required for filling the mesh pattern. Therefore, the minimum number can be determined from these values. The structuring element is set by a user and pre-stored in the memory of the morphological processing section 10.

The edge detecting section 12 detects edges of an image from which a mesh pattern has been removed by the morphological processing section 10. As techniques for detecting edges from images are well known in the art, specific techniques will not be described here.

The measuring section 14 uses edges detected by the edge detecting section 12 to measure the width and diameter of wiring of a wiring pattern included in an image and outputs the results. Specifically, the morphological processing section 10, the edge detecting section 12, and the measuring section 14 are formed by microprocessors of a computer (image processing computer) and image memory that stores input original image data or processed image data. An A/D converter may be provided which, if an input original image is an analog image, converts it to a digital data. Alternatively, the morphological processing section 10 may output a mesh-pattern-removed image as is, as the result of processing.

Figure 2:
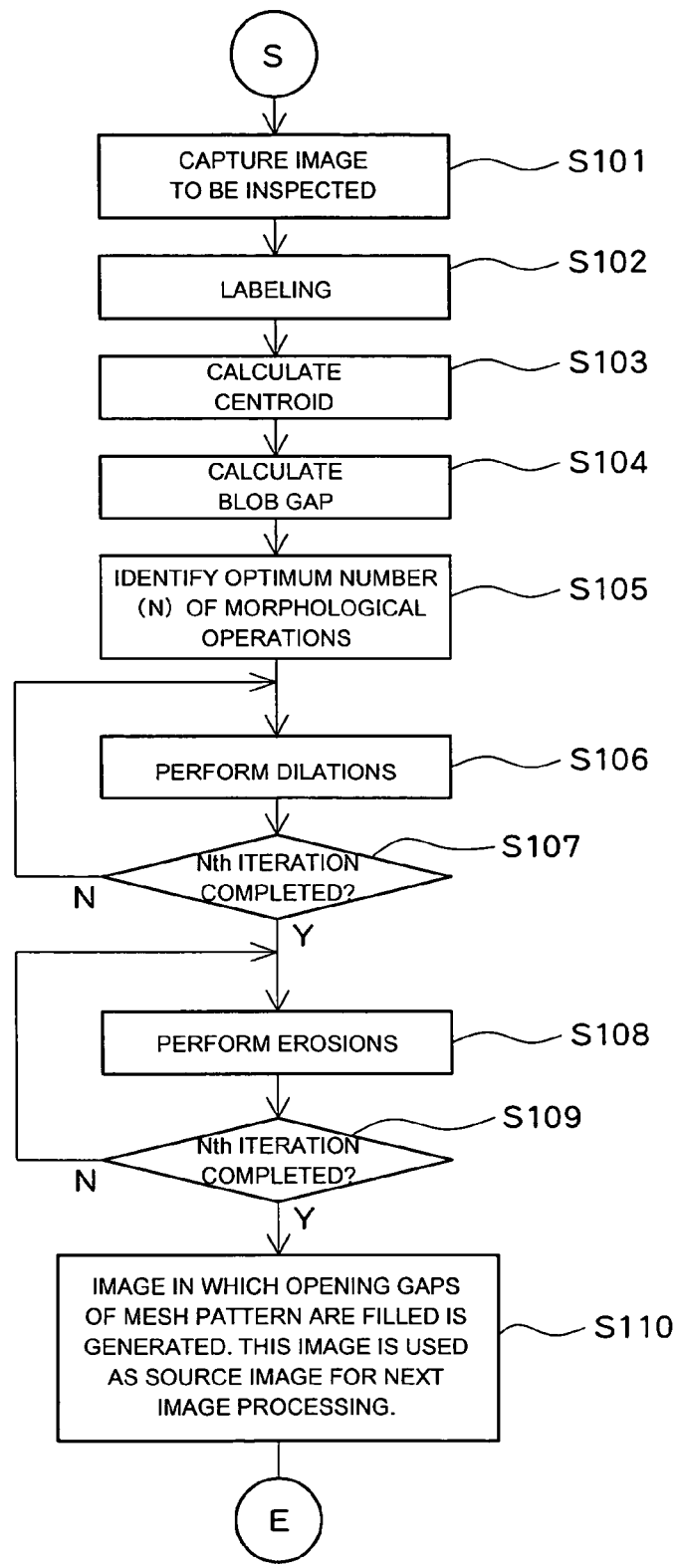
FIG. 2 is a flowchart of a process performed in a morphological processing section according to the present invention.
Figure 13:
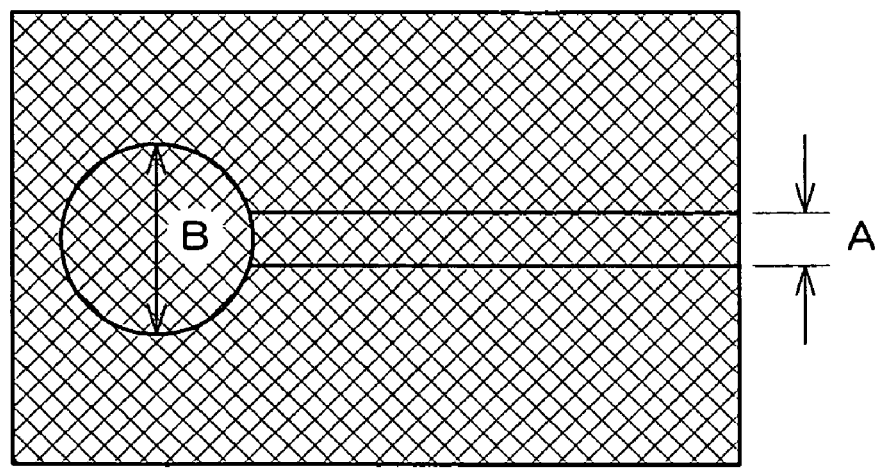
FIG. 13 is a diagram illustrating a masked image masked with a mesh pattern.

FIG. 2 shows an example of a flowchart of a typical process performed in the morphological processing section 10. The process flowchart is implemented by executing an image processing program installed in the computer in sequence, as required. First, an image to be inspected, in which the width and diameter of wiring are to be measured, is captured into the apparatus (S101). The image to be inspected may be a printed circuit board image with a meshed pattern as shown in FIG. 13.

Then, labeling is performed on the masked image (S102). The labeling converts the input image into a binary image of 0s and 1s, examines the contiguity of the pixels determined to be 1s, and labels the sets of contiguous pixels. A number of sets of contiguous pixels, namely a number of closed regions (blobs) are extracted by the labeling. The minimum unit for the labeling is a kernel, which is a structuring element for subsequent morphological processing. The sets that are smaller than the kernel are not labeled. The threshold for the binarization may be set on the basis of a histogram of the input image, or may be a value preset and stored in a memory. The extracted closed regions, represented by their label values and the coordinates of the regions where they exist, are stored in a memory.

After the closed regions are extracted by the labeling, at least two neighboring sets of centroid coordinates of closed region are calculated (S103). That is, the two-dimensional input image is projected onto an X-Y plane, a given point (for example the upper left corner point) of the input image is used as the origin of the X-Y plane, and the centroid coordinates (Xi, Yi) (where i=0, 1, 2, 3, . . . ) of each closed region are calculated with respect to the origin. Here, i denotes the label value of each closed region. The centroid coordinates (Xi, Yi) are a parameter that characterizes each region i. The centroid coordinates are stored in the memory along with the label values of the closed regions.

Figure 14:
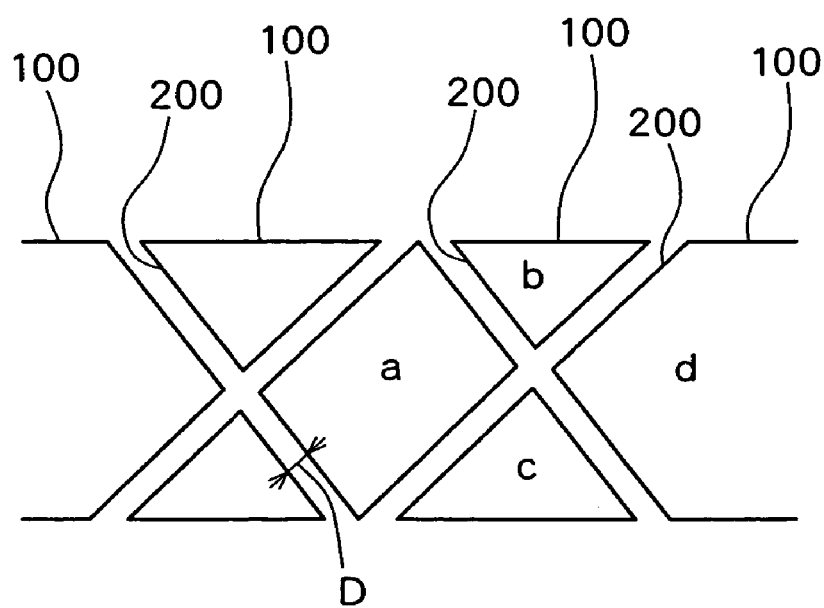
FIG. 14 is an enlarged view of a portion of FIG. 13.

After the centroid coordinates of the closed regions are calculated, the distance between the closed regions (blob gaps) are calculated (S104). The distance between the closed regions corresponds to the opening gap. In particular, two neighboring closed regions i, j are extracted from among the closed regions (blobs) and a vector whose starting and ending points are the centroid coordinates of the closed regions i, j is calculated. The length of the portion of the vector that is included neither of the closed regions i, j is the distance between the closed regions, namely the opening gap D. More particularly, an edge detecting operation of the input image is performed on the vector with the starting and ending points at the two sets of centroid coordinates, and the distance between the edges (that is, the boundaries of the closed regions) is calculated to obtain the opening gap D. Multiple pairs of two neighboring closed regions i, j may be extracted, the opening gap Di of each pair may be calculated, and the average value of the opening gaps Di may be obtained. Referring to FIG. 14, the opening gap is calculated from the centroid coordinates of each of the closed regions a and b and the opening gap is calculated form the centroid coordinates of each of the closed regions a and c, then the average of the two opening gaps is obtained. The opening gaps may be calculated from the closed regions b and d, and the closed regions c and d, of course.

Figure 3:
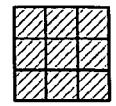
FIG. 3 is a diagram illustrating a structuring element (kernel) for morphological processing according to the present invention.

After the opening gap (blob gap) is calculated, the optimum number (N) of morphologic operation iterations is identified (S105) That is, the minimum number N of iterations required for filling the calculated opening gap is calculated. As stated above, the number N of iterations is calculated on the basis of the opening gap and the kernel, which is the structuring element. For example, if the opening gap is 4 (equivalent to 4 pixels) and the kernel consists of 3×3 pixels (that is, there is one pixel in each of the 8 directions, top, bottom, left, right, left top diagonal, left bottom diagonal, right top diagonal, and right bottom diagonal) as shown in FIG. 3, the opening gap between each pair of neighboring closed regions i, j can be filled by performing two dilation iterations on each of the pairs of neighboring closed regions i, j. Therefore, the required minimum number N of iterations is N=2. If the kernel consists of 3×3 pixels, then N=opening gap/(2×1)=D/2. If the kernel consists of 5×5 pixels (that is, there are two pixels in each of 8 directions, up, down, left, right, left upper diagonal, left lower diagonal, right upper diagonal, and right lower diagonal), then N=opening gap/(2× 2)=D/4. In general, N=opening gap/(2× number of displacement pixels of kernel).

After the required minimum number N of iterations is calculated, N dilations are performed on the labeled closed regions (S106 and S107). As a result of the dilations, the opening gaps between neighboring closed regions are filled and consequently the closed regions are integrated into one closed region.

Figure 4A:
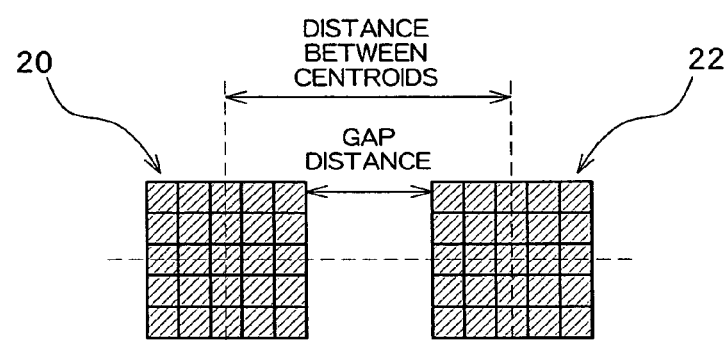
FIGS. 4A to 4C are diagrams illustrating a dilation process.
Figure 4B:
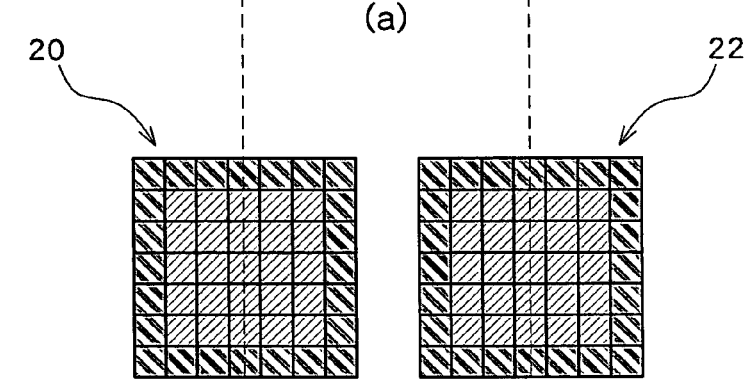
Figure 4C:
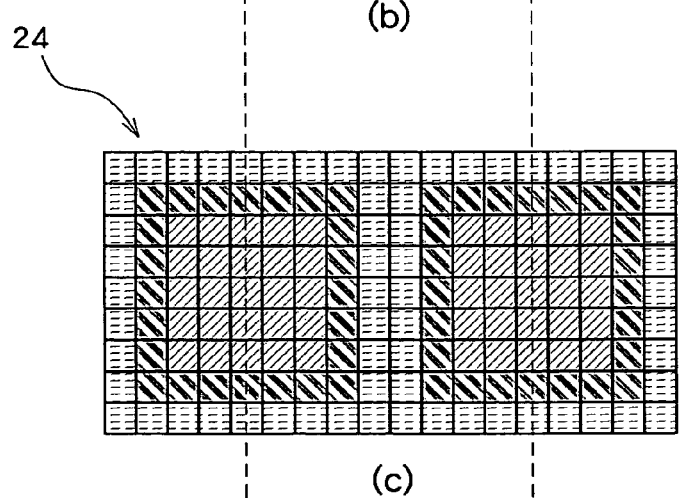

FIGS. 4A to 4C schematically show two dilations at S106 and S107. An opening gap (of four pixels) exists between two neighboring closed regions 20, 22. The first dilation is performed on the input image shown in FIG. 4A to displace the image in each of 8 directions by one pixel with respect to the closed regions 20, 22, and the Minkowski sum of the resulting image is calculated. Thus, the state shown in FIG. 4B results, in which two of the four pixels of the opening gap are filled. Then, the second dilation is performed on the state shown in FIG. 4B, resulting in the state shown in FIG. 4C, in which the remaining two pixels of the opening gap are filled and two closed regions 20, 22 are connected into one closed region 24.

Returning to FIG. 2, after the dilation operations are completed as described above, two erosions are performed to restore the dilated portion (S108 and S109). As a result, only one closed region containing no opening gap is left. This image resulting from the morphological processing is outputted as a source image for the next processing in the edge detecting section 12 (S110).

Figure 5A:
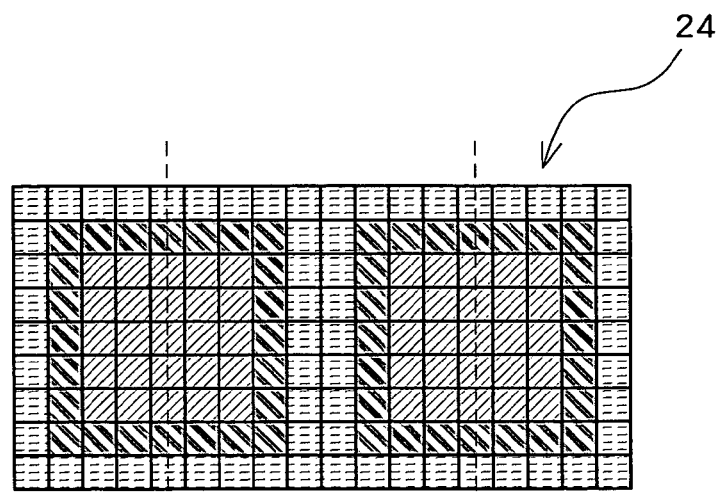
FIGS. 5A to 5C are diagrams illustrating an erosion process.
Figure 5B:
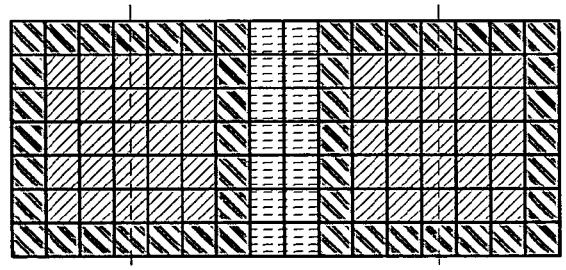
Figure 5C:
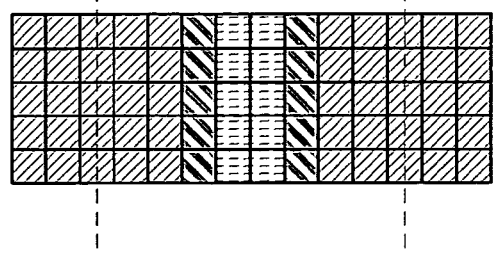

FIGS. 5A to 5C schematically show the two erosions performed at S108 and S109. FIG. 5A is the same as FIG. 4C. The first erosion is performed on the closed region 24 shown in FIG. 5A formed by the dilations to displace the image in the eight directions by one pixel and the Minkowski difference of the resulting image is calculated to obtain the state shown in FIG. 5B. Then the second erosion is performed to obtain the state shown in FIG. 5C, which is an image with the same size as that of the closed regions 20, 22 and in which the opening gap of four pixel is filled.

Figure 6:
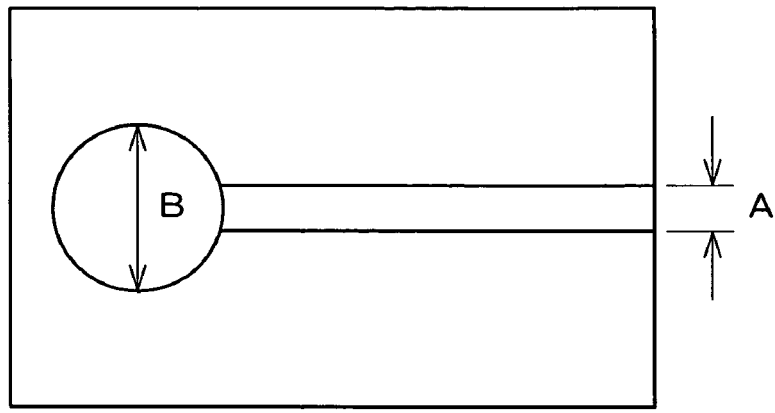
FIG. 6 is a diagram illustrating a processed image according to the present invention.
Figure 7:
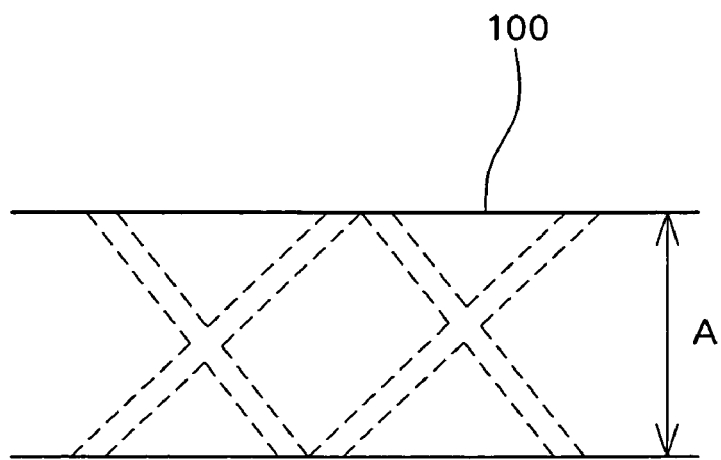
FIG. 7 is an enlarged view of a portion of FIG. 6.

FIG. 6 shows a processed image resulting from the required minimum N of iterations of dilations and N of iterations of erosions are performed on the masked image shown in FIG. 13 as described above. FIG. 7 shows an enlarged view of a portion of the wiring pattern shown in FIG. 6. The mesh pattern (which is indicated by the dashed lines in FIG. 7) has been removed and a wiring pattern image has been obtained. Detection of the edges 100 of the wiring pattern in the image shown in FIG. 7 is a simple matter. Furthermore, the number of the dilation operations and the erosion operations is minimized, so deformation of the original image (deformation of the wiring pattern) is minimal and consequently the width A and diameter B of the wiring can be measured accurately.

While the required minimum number N of iterations is determined by the opening gap/2×(the number of displacement pixels in kernel) as described above, if the resulting value is not a round number, it is rounded up to the nearest integer N, of course.

While the present embodiment has been described with respect to a mesh pattern by way of example, the present invention is not so limited but can be applied to any pattern. If an image of interest does not have periodicity, various opening gaps in a certain range will be obtained. In such a case, the maximum of the calculated opening gaps can be used to calculate the required minimum number N of iterations.

While a kernel (structuring element) of 3×3 pixels or 5×5 pixels has been used in the above examples, other structuring elements may be used or a structuring element may be optimized together with the number N of iterations of dilations and erosions. That is, the number of iterations N=opening gap/2×(number of pixels in kernel) of each of multiple structuring elements may be calculated and the structuring element that provides the smallest N may be selected as the optimum structuring element. The optimum structuring element will have been optimized in accordance with the mesh pattern to be removed.

While labeling has been used to extract closed regions and the centroid coordinates of neighboring closed regions have been used to calculate the opening gap, edge detection may be performed locally on an input image to extract the boundaries of closed regions without performing labeling, and the distance between the boundaries of the closed regions (the distance between the edges) may be calculated to obtain the opening gap.

Furthermore, the opening gap can be calculated by other methods without calculating the centroid coordinates of closed regions. Examples of such other methods include Fourier transformation and Radon transformation.

If the Fourier transformation is used, the morphological processing section 10 performs Fourier transformation (fast Fourier transformation) on an input image to calculate the amplitude spectrum of the image. Then, the frequency of a meshed mask pattern is extracted from the amplitude spectrum and the reciprocal of the frequency is obtained as the pitch, namely the opening gap, of the mesh pattern. After the opening gap is obtained, the number of displacement pixels of the kernel is used to calculate the required minimum number N of iterations as in the example described above.

Figure 8:
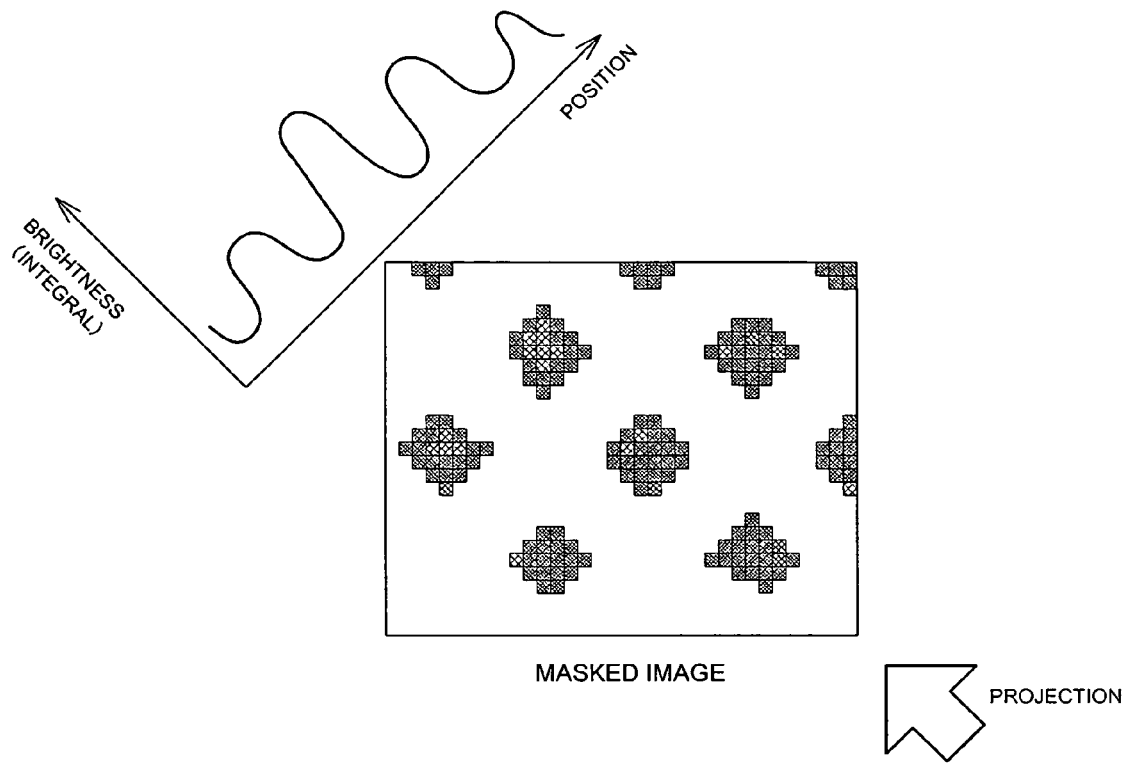
FIG. 8 is a diagram illustrating Radon transformation.
Figure 9:
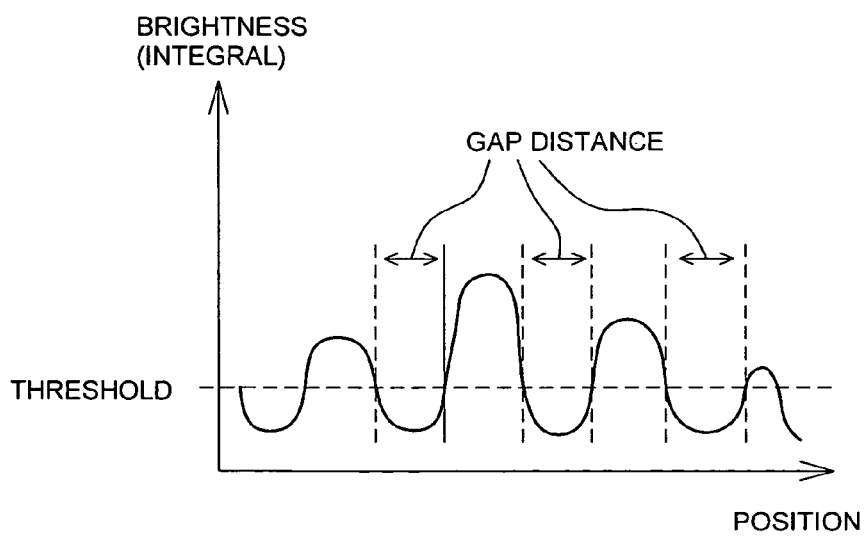
FIG. 9 is a diagram illustrating calculation of mask gaps by using Radon transformation.
Figure 11:
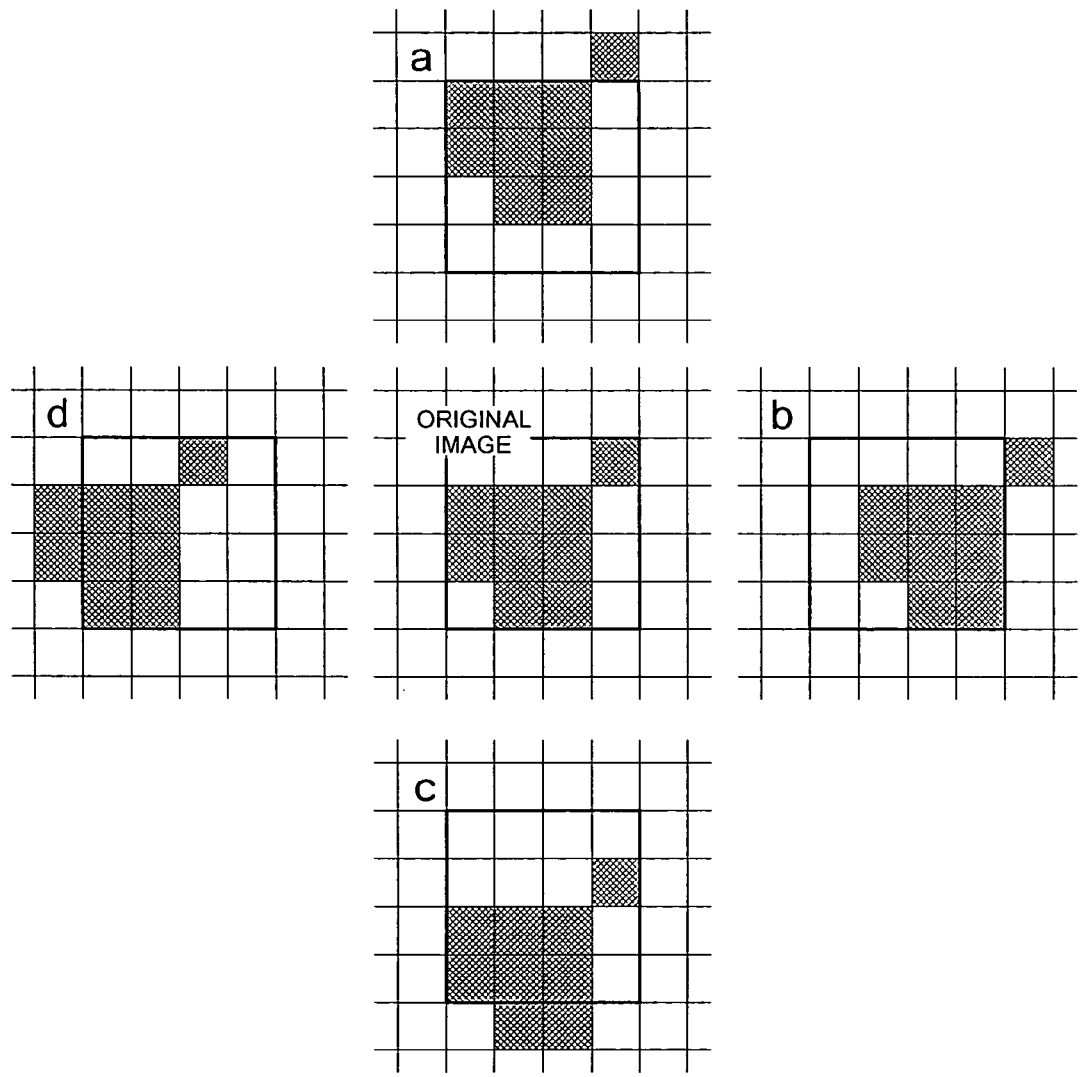
FIG. 11 is a diagram illustrating a set of images derived from the original image with the structuring element shown in FIG. 10B.

On the other hand, if the Radon transformation is used, the brightness integral of the projection of an input image along a certain direction is calculated for each projection angle, and the brightness integral is calculated with respect to the projection angle and position. FIG. 8 shows the distribution of brightness integral obtained by projection of an input image along the direction indicated by the arrow. A pitch corresponding to the mesh pattern appears in the brightness integral. The opening gap can be calculated by calculating the pitch. FIG. 9 shows the opening gap calculated from the brightness integral. An appropriate threshold is set for the brightness integral. The lengths of the portions of the brightness integral that are lower than the threshold are regarded as gap distances, which are then averaged to obtain the opening gap.

Although a specific illustrative embodiment of the present invention has been described above, the examples given are for illustrative purposes only, and other combinations are possible as long as the distance between brightness portions in a masked image, that are shielded with a mesh pattern and are separate from each other, are calculated and the minimum number of iterations required for filling the distance is obtained.

What is claimed is:

1. An image processing apparatus which processes an input image by performing dilation operations and erosion operations of morphological processing in sequence on the input image, comprising:
   means for inputting a masked image masked with a given mesh pattern;
   opening gap calculating means for calculating an opening gap in the mesh pattern in the masked image;
   means for setting a structuring element for morphological processing;
   means for calculating a required minimum number of iterations of dilation operations and erosion operations according to the opening gap and the structuring element; and
   means for removing the mesh pattern from the masked image by performing the required minimum number of iterations of the dilation operations on the masked image and then performing the required minimum number of iterations of the erosion operations.

2. The image processing apparatus according to claim 1, wherein the opening gap calculating means comprises:
   means for extracting closed regions in the masked image other than the mesh pattern; and
   means for calculating the opening gap as the distance between the boundaries of neighboring closed regions among the closed regions.

3. The image processing apparatus according to claim 1, wherein the opening gap calculating means comprises:
   means for extracting closed regions in the masked image other than the mesh pattern;
   means for calculating centroid coordinates of each of the neighboring closed regions among the closed regions; and
   means for calculating the opening gap from the centroid coordinates.

4. The image processing apparatus according to claim 1, wherein the opening gap calculating means comprises:
   means for Radon-transforming the masked image; and
   means for calculating the opening gap from a gray pattern obtained by the Radon transformation.

5. The image processing apparatus according to claim 1, wherein the opening gap calculating means comprises:
   means for Fourier-transforming the masked image; and
   means for calculating the opening gap from an amplitude spectrum obtained by the Fourier transformation.

6. The image processing apparatus according to claim 1, further comprising:
   means for detecting image edges in the masked image resulting from removing the mesh pattern.

7. An image processing method for processing an input image by performing dilation operations and erosion operations of morphological processing in sequence on the input image, comprising the steps of:
   inputting a masked image masked with a given mesh pattern; and
   using a processor to perform the sub-steps of: calculating an opening gap in the mesh pattern in the masked image;
   setting a structuring element for morphological processing;
   calculating a required minimum number of iterations of dilation operations and erosion operations according to the opening gap and the structuring element; and
   removing the mesh pattern from the masked image by performing the required minimum number of iterations of the dilation operations on the masked image and then performing the required minimum number of iterations of the erosion operations.

8. A computer-readable medium encoded with a computer program used in an image processing computer which processes an input image by performing dilation operations and erosion operations of morphological processing in sequence on the input image, comprising the steps of:
   inputting a masked image masked with a given mesh pattern;
   calculating an opening gap in the mesh pattern in the masked image;
   setting a structuring element for morphological processing;
   calculating a required minimum number of iterations of dilation operations and erosion operations according to the opening gap and the structuring element; and
   removing the mesh pattern from the masked image by performing the required minimum number of iterations of the dilation operations on the masked image and then performing the required minimum number of iterations of the erosion operations.

* * * * *